Nov. 19, 1929.  P. B. HARWOOD  1,736,401
MOTOR CONTROLLER
Filed July 19, 1928
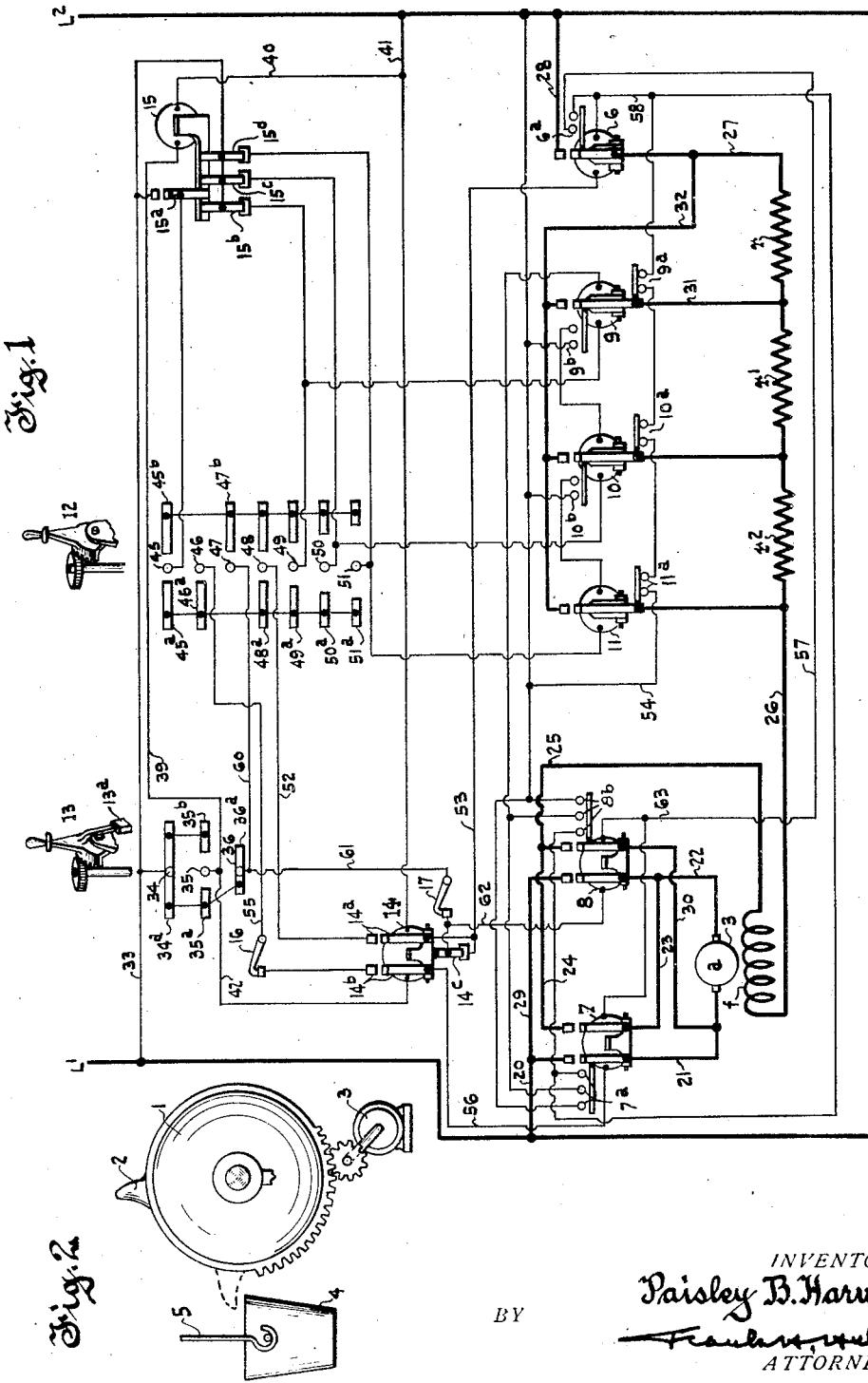
INVENTOR
Paisley B. Harwood.
BY
ATTORNEY Patented Nov. 19, 1929

1,736,401

UNITED STATES PATENT OFFICE

PAISLEY B. HARWOOD, OF MILWAUKEE, WISCONSIN, ASSIGNOR, BY MESNE ASSIGNMENTS, TO CUTLER-HAMMER INC., OF MILWAUKEE, WISCONSIN, A CORPORATION OF DELAWARE

MOTOR CONTROLLER

Application filed July 19, 1928. Serial No. 293,812.

This invention relates to improvements in controllers for electric motors.

Controllers embodying the invention are especially advantageous for motor operated metal mixers, but may be advantageously employed in other relations.

The invention has among its objects to provide for the aforesaid and other motor operated devices a controller for effecting reverse operations thereof and for effecting movement of the mixer or other device to a given or safe position should the attendant during its operation lose control thereof.

A further object is to provide a controller which will effect return of the mixer or other device to the desired position under the conditions aforestated at a high rate of speed.

Other objects and advantages of the invention will hereinafter appear.

The accompanying drawing illustrates one embodiment of the invention which will now be described, it being understood that the embodiment illustrated is suceptible of various modifications without departing from the scope of the appended claims.

In the drawing,

Figure 1 is a diagrammatic view of a controller especially applicable to metal mixers, and Fig. 2 is a schematic view of a metal mixer.

As shown in Fig. 2, the mixer comprises an oscillatable container 1 having a pouring spout 2, said container being oscillatable by a motor 3. The safe position of the container is that indicated in full lines, the same being movable into dotted line position or some other selected position to pour into a ladle or other receptacle 4 shown as supported upon a crane hook 5.

Referring to Fig. 1, the motor 3 is illustrated as comprising an armature $a$ and a series field $f$, and as having speed regulating resistances $r$, $r^1$ and $r^2$ in series therewith. However, it is to be understood that the motor might be of other types and might be provided with additional speed regulating means, as for example additional series resistances or an armature shunt, or both.

The controller illustrated comprises a main switch 6 and reversing switches 7 and 8 to connect the motor to supply lines $L^1$ $L^2$ for operation in opposite directions selectively, electroresponsive switches 9, 10 and 11 to control resistances $r$, $r^1$ and $r^2$, a main master controller 12, a dead man master 13, electroresponsive relays 14 and 15 and limit switches 16 and 17.

With the main switch 6 and reversing switch 7 closed a circuit for the motor may be traced from line $L^1$ by conductor 20 through the left hand pole of switch 7 by conductor 21 through the motor armature from left to right by conductors 22 and 23 through the right hand pole of switch 7 by conductors 24 and 25 through the motor field $f$ by conductor 26 through resistances $r^2$, $r^1$ and $r$ by conductor 27 through main switch 6 by conductor 28 to line $L^2$. On the other hand, with main switch 6 and reversing switch 8 closed a circuit for the motor may be traced from line $L^1$ by conductors 20 and 29 through the left hand pole of switch 8 by conductor 22 through the motor armature from right to left by conductors 21 and 30 through the right hand pole of switch 8 to conductor 25 and thence to line $L^2$ through the series field, resistances and main switch as previously traced. Thus provision is made for reverse operations of the motor and as will be apparent the switches 9, 10 and 11 provide for short circuiting of resistances $r$, $r^1$ and $r^2$, respectively. For example, switch 9 establishes a connection from a point between resistances $r$ and $r^1$ by conductors 31 and 32 to and through main switch 6 to line $L^2$.

The aforedescribed motor circuit commutations are obtainable at will by operation of the main master controller, but only when the dead man master is moved to and retained in one or the other of its extreme positions. The control arrangement is such that if the dead man master is released while the mixer is in other than safe position it is set in operation automatically for return to safe position and at high speed. More particularly, the dead man master controls through the medium of relay 15 a feed from line $L^1$ to the main master and said dead man master is biased as by a weight $13^a$ on its operating handle to a position to effect interruption of said line connection. Moreover, said dead man master when occupying the position shown effects through the medium of relay 14 interruption of circuit connections between the main master and the control switches while at the same time it effects energization of the main switch and one of the reversing switches. Further, the dead man master effects through the medium of relay 15, energization of the resistance switches whereby provision is made for return of the mixer to safe position at high speed, as aforestated, the mixer being arrested in such position by one of the limit switches.

The dead man master when moved into either of its extreme positions completes a circuit from line $L^1$ by conductor 33 to and through its contact 34 and segment $34^a$ to segments $35^a$ and $35^b$ and from one of the latter to contact 35 by conductor 39 through the winding of relay 15 by conductors 40 and 41 to line $L^2$. This circuit thus provides for energization of relay 15 which upon response completes through its contacts $15^a$ a connection between the uppermost contact of the main master and line $L^1$. Also, the dead man master at the same time completes a circuit from its contact 35 by conductor 42 through the winding of relay 14 to conductor 41 and thence to line $L^2$, thereby also energizing relay 14.

With relays 14 and 15 closed the main master is effective to control the motor at will in the usual manner subject to control by certain interlocking contacts associated with the control switches. For example, assuming movement of the main master for engagement of its contacts 45, 46 and 48 by its segments $45^a$, $46^a$ and $48^a$, circuit will be completed from line $L^1$ to master controller contact 45 as heretofore explained and thence through contacts $45^a$, $48^a$ and 48 by conductor 52 through contacts $14^a$ of relay 14 by conductor 53 through the winding of main switch 6 to and through auxiliary contacts $9^a$, $10^a$ and $11^a$ of the resistance switches by conductor 54 to line $L^2$. Also, circuit will be completed from line $L^1$ through contacts 46 and $46^a$ to conductor 55 and thence through limit switch 16 and contacts $14^b$ of relay 14 by conductor 56 through the winding of reversing switch 7 by conductor 57 through auxiliary contacts $6^a$ of the main switch by conductor 58 to line $L^2$ through the auxiliary contacts of the resistance switches, as heretofore described.

Thus provision is made for energization of the main switch and reversing switch 7 progressively to start the motor and said reversing switch has an auxiliary contact $7^a$ to establish a maintaining circuit for itself and the main switch in parallel with the aforementioned auxiliary contacts of the resistance switches. Also, the auxiliary contacts $7^a$ of reversing switch 7 complete a circuit between the winding of resistance switch 9 and line $L^2$ whereby switch 9 may be energized by engagement of the main master contacts 49 and $49^a$ to establish a connection between said winding and line $L^1$. Similarly, switch 9 upon response completes through its auxiliary contact $9^b$ a connection between the winding of switch 10 and line $L^2$ whereby switch 10 may be energized by engagement of the main master contacts 50 and $50^a$ to connect said winding to line $L^1$. Thus provision is made for excluding the resistances $r$ and $r^1$ progressively under the control of the main master and switch 10 upon response completes through its auxiliary contacts $10^b$ a connection between the winding of switch 11 and line $L^2$ whereby switch 11 may be energized by further movement of the master to engage its contacts 51 and $51^a$, for exclusion of resistance $r^2$.

Assuming reverse operation of the main master with the relays 14 and 15 closed it will upon initial movement effect energization of reversing switch 8 instead of reversing switch 7, whereas it will provide for establishment of all other circuits heretofore described in connection therewith. The energizing circuit of switch 8 may be traced from line $L^1$ to the main master contact 45 as heretofore described and thence through the main master contacts $45^b$, $47^b$ and 47 by conductors 60 and 61 through limit switch 17 by conductor 62 through the winding of switch 8 by conductor 63 to conductor 57 and thence to line $L^2$ through the auxiliary contacts of the main switch and the resistance switches as heretofore described, the auxiliary contacts of the resistance switches being paralleled by the auxiliary contacts $8^b$ of switch 8, upon closure of the latter.

The limit switches 16 and 17, as will be apparent, provide for stopping of the motor at opposite limits, the limit switch 16 so functioning by deenergizing reversing switch 7 and limit switch 17 by deenergizing reversing switch 8, opening of either reversing switch effecting deenergization of the main switch and the resistance switches, even though the main master remains in an operating position. As illustrated, the reversing switch 8 effects operation of the motor for clockwise rotation of the mixer and hence for return thereof to safe position while the limit switch 17 serves to stop the motor when the mixer reaches safe position.

Considering in further detail the control afforded by the dead man master its return to off position will deenergize both relays 14 and 15, thus effecting disconnection of the main master from line L¹ and interrupting certain connections between the main master and the motor controlling switches whereby the motor is stopped if running in a direction to move the mixer counterclockwise. Also, return of the dead man master to off position will complete circuit from line L¹ to and through its contacts 36 and 36ᵃ by conductor 61 through limit switch 17 and down contacts 14ᵉ of relay 14 to conductor 53 and thence through the winding of main switch 6 to line L² as heretofore described and from conductor 61 through limit switch 17 to conductor 62 and thence through the winding of reversing switch 8 to line L², as heretofore described. This provides for energization of the main switch and reversing switch 8 entirely independently of the main master for operation of the motor to return the mixer to safe position and for stopping the motor through the medium of limit switch 17 when the mixer reaches safe position.

Furthermore, the relay 15 when deenergized by return of the dead man master to off position completes through its down contacts 15ᵇ, 15ᶜ and 15ᵈ connections between line L¹ and the windings of resistance switches 9, 10 and 11, respectively, thereby providing for energization of said switches progressively upon completion of the motor circuit, as heretofore explained, but in this instance independently of the main master. Hence provision is made for return of the mixer at maximum speed, as aforestated.

What I claim as new and desire to secure by Letters Patent is:

1. The combination with motor controlling means, including reversing means, of a master controller for directing operation of said means and a safety switch biased to a position to render said master controller ineffective and to render said controlling means independently operable for motor operation in a given direction.

2. The combination with motor controlling means including reversing and limit switches, of a safety switch biased to a position to render said means effective for operation of the controlled motor in a given direction into a limit and a master controller for directing operation of said means at will, but only while said safety switch is restrained in a position other than that aforementioned.

3. The combination with motor starting and speed regulating means, of a main master controller and a safety switch for directing operation of said means, said main master controller being effective in certain of the positions of said safety switch to direct operation of said means for starting the controlled motor in opposite directions selectively and for speed regulation thereof and said safety switch being biased to a position to render said master controller ineffective and to render said means operative independently of said master controller for operation of the controlled motor in a given direction at an accelerated speed.

4. The combination with motor controlling means including reversing, speed regulating and limit switches, of a main master controller and a safety switch for directing operation of said means, said main master controller being effective in certain of the positions of said safety switch to afford direction and speed control at will and said safety switch being biased to a position to direct operation of said means independently of said master controller for high speed operation of the motor in a given direction into a limit.

5. The combination with motor controlling means affording reversal of the controlled motor and limitation of its operation in a given direction, of main and dead man master switches controlling said means, said dead man master switch being operable to render said main master controller effective for direction control and being operable automatically upon release to control said means independently of said main master switch for operation of the motor in the aforementioned direction into the limit established by said means.

6. The combination with motor controlling means affording reversal and speed regulation of the controlled motor and limitation of its operation in a given direction, of main and dead man master switches controlling said means, said main master switch being effective to afford direction and speed control at will when said dead man master switch is in certain of its positions and said dead man master switch being operable automatically upon release to control said means independently of said main master switch for operation of the motor at an accelerated speed in the aforementioned given direction.

7. The combination with motor controlling means including electroresponsive reversing switches, of a main master controller for said means to effect energization of said switches selectively, a dead man master switch and electroresponsive means controlled thereby to render said main master effective and ineffective to control said means and to render said means including a given reversing switch controllable by said dead man master switch independently of said main master controller for motor operation in a given direction.

8. The combination with motor controlling means including electroresponsive reversing switches, of a main master controller for said means to effect energization of said switches selectively, a dead man master switch and electroresponsive means controlled thereby to establish and interrupt connections between said main master switch and its supply line and between said main master switch and said means and to establish connections upon interruption of the aforementioned connections whereby said dead man master switch is afforded control of said means including a given reversing switch to effect motor operation independently of said main master controller.

In witness whereof, I have hereunto subscribed my name.

PAISLEY B. HARWOOD.